Nov. 10, 1942.  J. F. GREENE ET AL  2,301,273
COMPENSATING HYDROMETER
Filed April 17, 1939
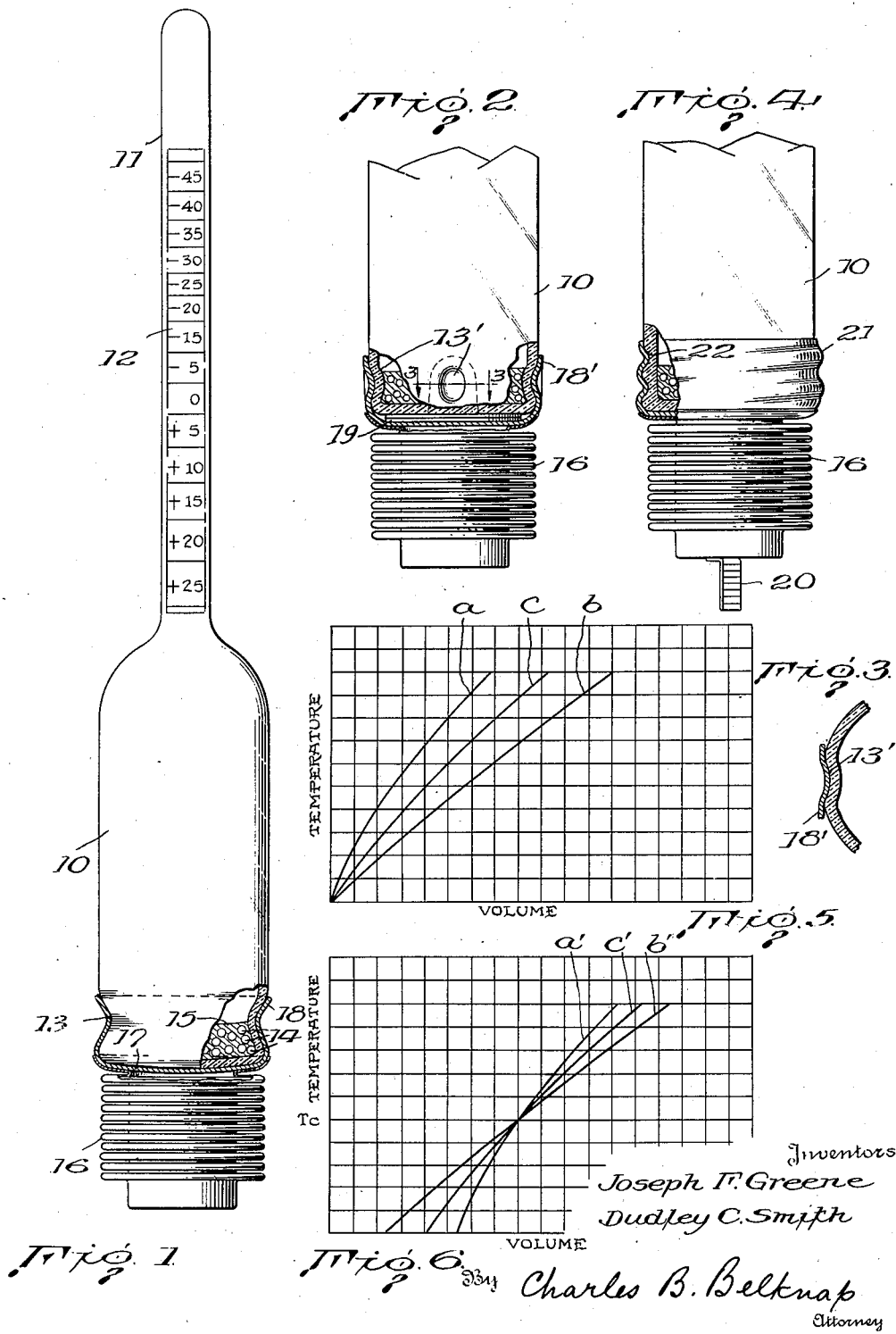
Inventors
Joseph F. Greene
Dudley C. Smith
By Charles B. Belknap
Attorney Patented Nov. 10, 1942

2,301,273

UNITED STATES PATENT OFFICE 2,301,273

COMPENSATING HYDROMETER

Joseph F. Greene and Dudley C. Smith, Vineland, N. J., assignors to Kimble Glass Company, Vineland, N. J., a corporation of Illinois Application April 17, 1939, Serial No. 268,366

3 Claims. (Cl. 265—45)

The present invention relates to hydrometers. More particularly, the invention pertains to an expansible chamber which is attached to a hydrometer and is responsive to variations in temperature of the liquid to be tested.

It is well known that the specific gravity of a liquid decreases when its temperature is increased. Hence, the buoyancy of a hydrometer floating in the warmed liquid is decreased.

It has previously been proposed to provide hydrometers with expansible chambers designed to compensate for changes in specific gravity of liquid due to variations in the temperature thereof, but, because of the difficulties encountered in forming these chambers in or on the hydrometer, such devices have been unsatisfactory. Also, some flexible elements which are ordinarily satisfactory for expansible chambers will, after being used in testing liquids, begin to absorb the liquid and cause the mass of the hydrometer to be changed. Still other materials disintegrate or dissolve in certain liquids.

While it is difficult to compensate for changes in specific gravity with complete exactness, for practical purposes an expansible element, the expansion of which conforms to the expansion of the liquid being tested, will give satisfactory results. A metallic bellows, for instance, the expansion of which is equal to the expansion of the volume of the liquid displaced by the hydrometer, will, when attached to the hydrometer, so change the volume of the combined bellows and hydrometer as to give substantially correct readings within the range of temperatures ordinarily encountered in the use of a hydrometer.

It is, therefore, an object of the invention to provide an expansible chamber which is easily attached to the float portion of a hydrometer and which is relatively inexpensive.

It is a further object of the invention to provide means for further compensation with respect to the effect of varying barometric pressure on the expansible member.

It is still another object of the invention to so calibrate the assembled hydrometer as to reduce all unavoidable temperature errors sufficiently that the instrument will be satisfactory for practical purposes.

The invention will be more clearly understood from the following description thereof taken in connection with the accompanying drawing, in which—

Fig. 1 is an elevation, partly in section, of a compensating hydrometer made in accordance with the present invention;

Fig. 2 is a fragmentary view of a hydrometer having a modified form of attaching means and additional means for changing the mass of the hydrometer so that it compensates for both specific gravity and barometric pressure;

Fig. 3 is a partial section taken on line 3—3 of Fig. 2;

Fig. 4 is a fragmentary view of a further modified form of attaching and weighting means;

Fig. 5 is a chart illustrating the expansion of liquids of different concentrations; and Fig. 6 is a chart showing expansions of the same liquids and illustrating graphically the manner in which calibration of a hydrometer by the present invention may be effected.

As will be seen in Fig. 1, the hydrometer consists of a float portion 10 and a reduced stem portion 11, the latter having a graduated scale 12 associated therewith. Near its bottom the float portion 10 is constricted circumferentially as at 13, or by spaced indentations 13', as shown in Fig. 2, for a purpose to be explained hereinafter. The float is weighted in the usual manner by means of shot 14 and sealing wax 15.

Secured to the bottom of the hydrometer float is a metallic bellows 16. It will be seen that the top wall of the bellows comprises a flat or slightly concave metallic disc 17 having formed integrally therewith in Fig. 1 an inverted skirt or flange 18. This skirt is crimped or spun to conform with the lower constricted end of the hydrometer float and form a tight fit therewith.

The expansible member is constructed in such a way as to provide a carefully controlled expansion when subjected to varying conditions of temperature. The regulation of the expansible member is accomplished either by charging the expansible member with a gas at any desired pressure, the pressure of the gas then serving to actuate the expansible member and to produce the volume change desired, or filling the expansible member with an expansible liquid, whose volume change produces a like change in volume of the expansible member, or partially filling the expansible member with a volatile liquid or mixture of volatile liquids whose vapor pressure serves to actuate the expansible member and produce the desired changes in volume.

The last-named method of regulation is of particular interest in connection with the compensating hydrometer, but either of the other two are desirably employed for particular uses.

As an example of one method of calibrating the hydrometer, a volatile liquid or mixture of liquids is carefully selected with reference to the dimensions, stiffness and other properties of the bellows. The expansion of the bellows or other expansible member is then adjusted to correspond with a particular solution, the expansivity of which represents an average for the entire range of solutions to be covered.

In the graph illustrated in Fig. 5, the curve indicated at *a* represents the expansion of a relatively dilute solution, that is, a solution near the lower limit of the range of concentrations which the instrument is capable of testing. On the other hand, the curve indicated at *b* illustrates the expansion of a relatively concentrated solution of the same liquid. Curve *c* will then represent an average for the expansivities of all the solutions whose specific gravity it is desired to test. This curve is the one which is most desirable to be approximated by the expansible member. However, the deviation between the several curves is relatively large in the upper temperature range. It has been found, for instance, that this deviation results in errors in reading of as much as fifteen degrees in the freezing point of the solution being measured and is undesirable in any commercial instrument.

In order to reduce as much as possible the deviations before mentioned, the present compensating hydrometer is calibrated to reduce the magnitude of errors due to temperature. This is done by calibrating the assembled hydrometer at a temperature between the extremes of the temperature range over which the instrument is to be used, this calibrating temperature being carefully controlled.

As illustrative of the manner in which this calibrating temperature is arrived at, reference is made to Fig. 6, wherein a calibrating temperature is indicated at Tc, and expansion curves similar to those in Fig. 5 are shown at *a'*, *b'*, and *c'*. Thus it will be seen that the temperature deviations are divided between the two halves of the temperature range and the maximum deviations at either extreme of temperature are considerably smaller than those at the highest temperature as shown in Fig. 5. By thus calibrating the instrument at an intermediate controlled temperature, deviations are sufficiently reduced to make the instrument commercially practical. The curves shown in Figs. 5 and 6 are based on the expansion of a specific volume of liquid, this specific volume being the displacement of the hydrometer.

A preferred method of calibrating the combined hydrometer and expansible chamber will now be described. The hydrometer with the expansible chamber attached thereto and having the upper end of the reduced stem portion open, is placed in a liquid having a predetermined specific gravity corresponding to one extreme of the scale range of the hydrometer. The liquid into which the hydrometer is placed is constantly maintained at a predetermined temperature by suitable temperature control methods, this predetermined temperature corresponding, for instance, to the average of the extremes of temperature at which the instrument is to be used, or, if the hydrometer is likely to be used frequently for testing solutions at relatively high temperatures, the predetermined temperature may be somewhat above the average of the extreme temperatures referred to. If, for instance, the hydrometer is intended for use in the testing of anti-freeze solutions in automobile radiators, the calibrating temperature should be near the upper limit of temperature range, since these solutions are usually tested while warm. Generally speaking, the selected temperature should be that which will give optimum accuracy over that portion of the temperature range considered most important for a particular purpose. A note scale is inserted in the stem after the liquid has been brought to the desired temperature, this scale having equi-distantly spaced graduations thereon. The hydrometer is then made to float at a convenient point, that is, with the level of the liquid at a point on the stem near the lower end thereof. In most cases, it is necessary to add shot or other suitable weight material to cause the hydrometer to float at the desired level. With the hydrometer floating in this position in the relatively dense liquid, a reading on the note scale is recorded.

The hydrometer is then transferred to a second liquid having a specific gravity equal to the least dense solution to be tested by the scale range. This second liquid is also maintained at a temperature corresponding to an average of the extremes of temperature at which the instrument is to be used. This average temperature is, of course, the same for both the dense and dilute solutions. Again a reading on the note scale is recorded. These two readings of extremes in density serve to establish the length of the scale required by the particular hydrometer under test. The note scale is then removed and an appropriate scale for the hydrometer is placed in the stem and secured therein by any suitable adhesive.

The scale having been inserted in the hydrometer stem, the open end of the stem is heated and sealed. The ballast material, if resinous, is then melted to maintain it in place in the lower end of the hydrometer float. This resinous ballast may be heated by detaching the bellows or the bellows may be left secured to the hydrometer, but, in the latter case, it will be necessary to employ suitable cooling means for the bellows while the resinous material is melted.

Since it is desirable that the compensating hydrometer described herein be manufactured commercially for use in all parts of the country, it is advisable that further compensating means be employed to avoid deviations due to changes in barometric pressure. For instance, a compensating hydrometer used in a city at or near sea level will not perform in the same way as one used in certain locations having a relatively high altitude.

In order to readily modify the mass of the instrument to compensate for these variations in barometric pressure, there is shown in Fig. 2 an arrangement wherein it is possible to insert between the glass float and the bellows one or more weights 19 which will add to the weight of the hydrometer. These weights may be removed or added to by merely removing the bellows. It will be seen in this figure that spring fingers or clips 18' are employed, these clips being designed to cooperate either with a circumferential constriction or with the indentations 13' and being so shaped that even when the weights are inserted between the float and the bellows the clips will tightly hug the lower end of the float. An advantage of the spring clip attachment as shown in Fig. 2, is that after calibration, the bellows containing the actuating fluid can be detached and the lower portion of the float heated to melt the wax or resinous material which serves to hold the ballast in place.

The particular construction of the spring clip arrangement offers a further advantage in that any liquid retained between the glass portion of the float and the bellows will be flushed out by a subsequent immersion of the float in a new liquid to be tested.

Another manner in which the mass of the instrument may be modified is shown in Fig. 4, wherein a metal spur 20 is secured to the lower end of the bellows. This spur is crimped or marked into segments, any number of which may be removed by cutting or clipping, thus altering the mass of the hydrometer to correspond with the altitude of the location in which the hydrometer is to be used. As shown in this figure, the manner in which the bellows is attached to the float differs from that followed in Figs. 1 and 2, in that the bellows is provided with a threaded circumferential flange 21 cooperating with a threaded portion 22 at the lower end of the float. In the hydrometer shown in Fig. 4, the bottom of the float may be closed or open. If open, a suitable cement may be used to secure the bellows to the float and form a liquid-tight seal.

While a preferred form of hydrometer and expansible chamber is illustrated and described herein, it is to be understood that the type of expansible chamber is not necessarily limited to a bellows, nor is the manner of attaching the expansible chamber to the float to be construed as limiting the invention to the exact type of attaching means shown in the drawing. The term "constriction," for example, is intended to define a circumferential recess or groove, either in one plane or in the form of a helix or thread, as well as indentations designed to accommodate spring fingers, threaded cups or skirts crimped or spun on the float. It is therefore, intended that the appended claims be given a broad meaning within the usual range of equivalents.

Having described our invention, what we claim as new and desire to secure by Letters Patent is:

1. A compensating hydrometer comprising a float portion, a closed expansible metallic chamber, metallic fingers on said chamber for detachably holding said chamber in contiguous relation to the bottom of said float portion, and separate removable weight means supported between said chamber and said float portion for changing the mass of the assembled float and chamber.

2. A compensating hydrometer comprising a float portion, a closed temperature expansible chamber, resilient means on said chamber for detachably holding said chamber in contiguous relation to the bottom of said float portion, and separate removable weight means supported between said chamber and said float portion for changing the mass of the assembled float and chamber.

3. A compensating hydrometer comprising a float portion closed at its lower end, said portion having a circumferential constriction adjacent said closed end, and a closed temperature expansible metallic chamber, one end wall of said chamber having integral therewith a plurality of resilient fingers adapted to be snapped over said closed lower end to engage said constriction whereby said chamber is detachably secured to said float portion exteriorly of said float portion.

JOSEPH F. GREENE.
DUDLEY C. SMITH.